United States Patent
Nelson et al.

(10) Patent No.: US 10,975,985 B2
(45) Date of Patent: Apr. 13, 2021

(54) POSITION SENSORS FOR VALVE SYSTEMS AND RELATED ASSEMBLIES, SYSTEMS AND METHODS

(71) Applicant: FLOWSERVE MANAGEMENT COMPANY, Irving, TX (US)

(72) Inventors: Michael P. Nelson, Lehi, UT (US); Bruce J. Butler, Payson, UT (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 16/642,754

(22) PCT Filed: Dec. 5, 2017

(86) PCT No.: PCT/US2017/064605
§ 371 (c)(1),
(2) Date: Feb. 27, 2020

(87) PCT Pub. No.: WO2019/112556
PCT Pub. Date: Jun. 13, 2019

(65) Prior Publication Data
US 2020/0378526 A1    Dec. 3, 2020

(51) Int. Cl.
*F16K 37/00* (2006.01)
*G01D 5/02* (2006.01)
(Continued)

(52) U.S. Cl.
CPC ........ *F16K 37/0041* (2013.01); *F16K 31/535* (2013.01); *F16K 37/0008* (2013.01);
(Continued)

(58) Field of Classification Search
CPC ......... F16K 31/50–508; F16K 37/0008; F16K 37/0041; F16K 37/0033; G01D 5/02;
(Continued)

(56) References Cited

U.S. PATENT DOCUMENTS 3,554,086 A    1/1971   Wills
3,727,283 A    4/1973   Wognum
(Continued)

FOREIGN PATENT DOCUMENTS

EP    0366594    5/1990
EP    1441266    7/2004
(Continued)

OTHER PUBLICATIONS

PCT Application No. PCT/US2017/064605, International Search Report dated Aug. 30, 2018, 6 pp.
(Continued)

*Primary Examiner* — Seth W. Mackay-Smith
(74) *Attorney, Agent, or Firm* — Phillips Winchester

(57) ABSTRACT

Positioner assemblies may be configured to sense at least one position of at least a portion of a valve assembly that is moved along a first axis of movement. A movable element of the positioner assembly is configured to rotate about a second axis of movement, where the first axis of movement is substantially parallel to the second axis of movement. Valve systems and methods of sensing a position of a component of a valve system may include such a positioner assembly.

20 Claims, 4 Drawing Sheets

(51) Int. Cl.
*G01D 5/04* (2006.01)
*G01D 5/56* (2006.01)
*F16K 31/53* (2006.01)
*G05D 7/06* (2006.01)

(52) U.S. Cl.
CPC .......... *F16K 37/0083* (2013.01); *G01D 5/02* (2013.01); *G01D 5/04* (2013.01); *G01D 5/56* (2013.01); *G05D 7/0635* (2013.01)

(58) Field of Classification Search
CPC ............ G01D 5/04; G01D 5/56; G05D 7/018; G05D 7/005; G05D 16/2093
USPC .................................................. 251/129.04
See application file for complete search history.

(56) References Cited

U.S. PATENT DOCUMENTS

| | | | |
|---|---|---|---|
| 3,852,379 A | 12/1974 | Shishido et al. | |
| 4,129,987 A | 12/1978 | Blume | |
| 4,154,262 A | 5/1979 | Blume et al. | |
| 4,198,030 A | 4/1980 | Jackson et al. | |
| 4,202,524 A | 5/1980 | Brakebill | |
| 4,582,183 A | 4/1986 | Kuroda | |
| 4,586,259 A * | 5/1986 | Kato | F16H 21/42 33/1 PT |
| 4,708,193 A | 11/1987 | Tinnes | |
| 4,882,977 A | 11/1989 | Himeno et al. | |
| 4,907,490 A * | 3/1990 | Taylor | B60H 1/00835 137/625.65 |
| RE33,649 E * | 7/1991 | Kawai | G01F 1/26 137/554 |
| 5,137,257 A * | 8/1992 | Tice | F16K 31/04 185/40 R |
| 5,197,328 A | 3/1993 | Fitzgerald | |
| 5,197,516 A | 3/1993 | Smietana | |
| 5,243,188 A * | 9/1993 | Hattori | B62D 15/02 250/231.16 |
| 5,345,856 A | 9/1994 | Willoughby | |
| 5,411,239 A | 5/1995 | Sorensen | |
| 5,513,963 A | 5/1996 | Walton | |
| 5,533,544 A | 7/1996 | Good et al. | |
| 5,853,022 A | 12/1998 | Eggleston et al. | |
| 5,974,945 A | 11/1999 | Gooch | |
| 5,979,864 A | 11/1999 | Eggleston | |
| 5,988,205 A | 11/1999 | Eggleston | |
| 6,000,675 A | 12/1999 | Eggleston | |
| 6,062,534 A | 5/2000 | Eggleston | |
| 6,112,638 A | 9/2000 | Loechner | |
| 6,276,458 B1 | 8/2001 | Malone et al. | |
| 6,285,913 B1 | 9/2001 | Hagglund | |
| 6,471,182 B1 | 10/2002 | McIntosh | |
| 6,487,956 B1 | 12/2002 | Holm et al. | |
| 6,776,389 B2 * | 8/2004 | Ito | G05D 16/2095 251/129.04 |
| 6,796,718 B2 | 9/2004 | Jones et al. | |
| 7,049,542 B2 | 5/2006 | Wright et al. | |
| 7,219,691 B2 | 5/2007 | Gethmann et al. | |
| 7,334,514 B2 | 2/2008 | Shu | |
| 7,436,312 B2 | 10/2008 | Schultz | |
| 8,302,624 B2 * | 11/2012 | Noh | F16K 37/0041 137/554 |
| 8,316,356 B2 | 11/2012 | Frey | |
| 8,714,521 B2 | 5/2014 | Nelson et al. | |
| 8,869,675 B2 | 10/2014 | Kiesbauer et al. | |
| 9,188,237 B2 | 11/2015 | Dolenti et al. | |
| 9,212,671 B2 | 12/2015 | Karte | |
| 9,725,246 B2 | 8/2017 | Pawelski et al. | |
| 9,739,682 B2 | 8/2017 | Schoonover et al. | |
| 9,772,046 B2 | 9/2017 | Kullen et al. | |
| 2009/0178713 A1 | 7/2009 | Tondolo | |
| 2009/0301238 A1 | 12/2009 | Wintsch et al. | |
| 2010/0276016 A1 | 11/2010 | Noh et al. | |
| 2011/0233441 A1 * | 9/2011 | Miners | F16K 3/0254 251/324 |
| 2015/0226580 A1 * | 8/2015 | Dequarti | F16K 37/0008 324/207.25 |
| 2015/0276086 A1 | 10/2015 | Wheeler et al. | |
| 2015/0276087 A1 | 10/2015 | Schoonover | |
| 2015/0278144 A1 | 10/2015 | McLaughlin et al. | |
| 2015/0285398 A1 | 10/2015 | Govindan et al. | |
| 2016/0356396 A1 | 12/2016 | Kah | |
| 2017/0114927 A1 | 4/2017 | Schoonover et al. | |
| 2017/0183243 A1 | 6/2017 | Reitmeyer et al. | |
| 2017/0213335 A1 | 7/2017 | Gattu et al. | |
| 2017/0269676 A1 | 9/2017 | Belmarsh et al. | |
| 2017/0292630 A1 | 10/2017 | Prescott et al. | |

FOREIGN PATENT DOCUMENTS

| | | |
|---|---|---|
| EP | 3088780 | 11/2016 |
| FR | 2079871 | 11/1971 |
| GB | 1141915 | 2/1969 |
| GB | 1262605 | 2/1972 |
| GB | 2119929 | 11/1983 |
| GB | 1323003 A | 7/2017 |
| KR | 100866099 | 4/2007 |
| SU | 1255793 A1 | 9/1986 |
| WO | WO2017158444 | 9/2017 |
| WO | WO 2019/112556 A1 | 6/2019 |

OTHER PUBLICATIONS

PCT Application No. PCT/US2017/064605, Written Opinion dated Aug. 30, 2018, 4 pp.
Valve Positioner Designs—2 pages—Nov. 2016.
Fieldvue DVC5000 Series Digital Valve Controllers—131 pages—May 1998.
BSA Lead Screws—16 pages—Apr. 2014.
CCI DRAG® Compressor RecycleAnti-surge Valve—8 pages—2003.
Masoneilan* SVi* 1000 Positioner—88 pages—2016.

* cited by examiner

POSITION SENSORS FOR VALVE SYSTEMS AND RELATED ASSEMBLIES, SYSTEMS AND METHODS

CROSS-REFERENCE TO RELATED APPLICATIONS

This application is a national phase entry under 35 U.S.C. § 371 of International Patent Application PCT/US2017/064605, filed Dec. 5, 2017, designating the United States of America and published in English as International Patent Publication WO 2019/112556 A1 on Jun. 13, 2019 for "Position Sensors for Valve Systems and Related Assemblies, Systems and Methods," the disclosure of which is hereby incorporated herein in its entirety by this reference.

TECHNICAL FIELD

The present disclosure relates generally to one or more sensors (e.g., a positioner) for use with a system, for example, a valve system including one or more of a valve and a valve actuator, and more particularly, to a valve positioner utilized to detect a position of one or more components of a valve system (e.g., a valve element) and related systems, assemblies, and methods.

BACKGROUND

Valves (e.g., process valves) are used in a myriad of industrial applications for controlling the flow of a fluid. For example, in chemical processing plants or oil refineries, valves are used to manipulate a flowing fluid to compensate for increases or decreases in demand, or other load disturbances, and keep the regulated flow as close as possible to a desired set point.

A valve is typically provided as part of a valve assembly having a valve, a valve actuator, and one or more sensors (e.g., a positioner). The valve includes an inlet and an outlet, with a movable valve element that is selectively positioned between the inlet and the outlet. Flow through the valve is adjusted by changing the position of the valve element. The valve actuator typically includes a stem connected to the valve element and provides the necessary motive force for moving the valve element via the stem. Valve actuators may be manually driven, electrically driven, operated by fluid pressure in which the shaft is connected directly or indirectly to a fluid operated piston, or other hydraulic systems.

In order to operate and monitor valve systems, one or more sensors may be implemented to monitor the position of various components of the valve systems. For example, sensors may be utilized to measure the position of various valve components such as valves, valves stem, and various components of the valve actuators used to operate the valve. Further sensors may be utilized to monitor the various components of a valve actuator to determine position of one or more of the actuator or the valve being controlled by the actuator. For example, a valve positioner may provide a closed-loop feedback system by monitoring the position of the valve element, or more commonly, the position of the actuator stem. A control system in communication with the positioner may compare a detected position to a desired set point. If a deviation between the two is detected, which, for example, may result in an undesirable flow through the valve, the positioner generates a signal to the actuator to adjust the position of the valve element accordingly.

Such valve assemblies can be provided in a variety of forms. In one arrangement, the valve is configured as a sliding stem valve. In such a valve, a sliding plug or piston is moved within a frame or a cage positioned between an inlet and an outlet of the valve. Depending on the position of the plug, the cross-sectional area of opening between the inlet and the outlet is adjusted, allowing more or less fluid to traverse through the valve. The actuator for such a valve can also be provided in a variety of forms, but commonly has a movable stem directly coupled to a valve stem extending from the valve plug, and employs fluid pressure (e.g., gas and/or liquid pressure), within a diaphragm casing of the actuator to cause the actuator stem to move.

The positioner of a valve system is typically mounted on the outside of the actuator, and includes a sensor therein adapted to receive a signal from a transmitter mounted on the sliding stem of the actuator. However, certain drawbacks are encountered with such positioners. For example, pinch points are created within the power and signal wiring connected to the transmitter that can result in malfunctions or erroneous readings. In addition, the receiver may be subjected to physical damage as it is exposed to the elements and the working environments of the facility in which the valve is installed. Misalignment can occur as the receiver is often mounted onto the housing using relatively simple brackets or the like, with such misalignment also contributing to inaccurate readings. Accordingly, periodic adjustment and/or recalibration are necessary, contributing to higher maintenance costs.

SUMMARY

In some embodiments, the present disclosure includes a valve system including a valve assembly configured to alter at least one flow characteristic of fluid flow through the valve system, a valve actuator configured to move at least a portion of the valve assembly between at least two positions along a first axis of movement, and a positioner assembly configured to sense at least one of the at least two positions of the at least a portion of the valve assembly. A rotatable element of the positioner assembly is configured to rotate about a second axis of movement, where the first axis of movement is substantially parallel to the second axis of movement.

In some embodiments, the present disclosure includes a positioner assembly for a valve system. The positioner assembly includes a rotatable element defining a track, where the rotatable element is configured to rotate about a first axis of movement that is substantially parallel to a second axis of movement of a linearly movable feature of the valve system configured to adjust fluid flow through the valve system. The positioner assembly further includes a follower element in communication with the track of the rotatable element, where the follower element is configured to be coupled to the linearly movable feature of the valve system. The follower element is configured to rotate the rotatable element in response to movement of the linearly movable element of the valve system along the second axis of movement. The positioner assembly further includes at least one position sensor coupled to the rotatable element that is configured to sense an angular position of the rotatable element.

In additional embodiments, the present disclosure includes a method of sensing a position of a component of a valve system. The method includes moving a component of a valve system in a direction along an axis, rotating a movable element about the axis in response to the moving of the component of the valve system, and sensing a position of the movable element with at least one sensor.

In some embodiments, the method further includes determining a position of the component of the valve system based on the sensed position of the movable element.

The features, advantages, and various aspects of the present disclosure will be apparent to those skilled in the art from a consideration of the following detailed description taken in combination with the accompanying drawings.

BRIEF DESCRIPTION OF THE DRAWINGS

While the specification concludes with claims particularly pointing out and distinctly claiming that which is regarded as the present disclosure, the advantages of this disclosure can be more readily ascertained from the following description of the disclosure when read in conjunction with the accompanying drawings.

DETAILED DESCRIPTION

Figure 1:
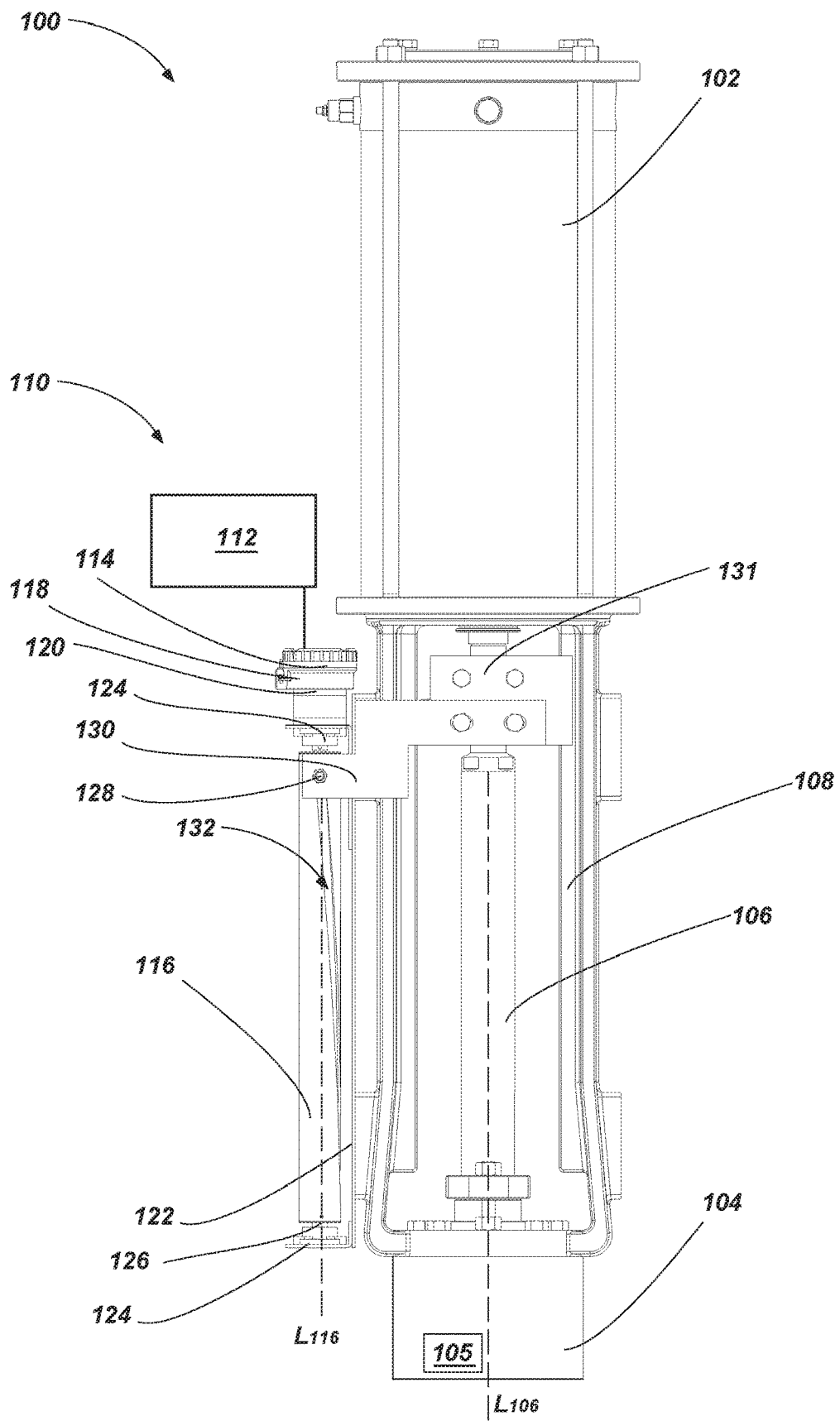
FIG. 1 is a front view of a system including a valve actuator coupled to a valve assembly with the valve assembly in an open position in accordance with an embodiment of the present disclosure.

In the following detailed description, reference is made to the accompanying drawings, which form a part hereof, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the scope of the disclosure. The illustrations presented herein are not meant to be actual views of any particular system, device, structure, or assembly, but are merely idealized representations that are employed to describe the embodiments of the present disclosure. The drawings presented herein are not necessarily drawn to scale. Additionally, elements common between drawings may retain the same numerical designation.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

The methods, devices, apparatus, assemblies, and systems of the present disclosure include a sensor (e.g., a position sensor, a positioner) for use with a system, for example, a valve system including one or more of a valve assembly and a valve actuator. For example, such a positioner (e.g., a valve positioner) may be utilized to detect a position of one or more components of a valve system (e.g., a valve element).

In some embodiments, a positioner as disclosed herein may include a positioner element that it movable (e.g., rotatable) about an axis (e.g., longitudinal axis, centerline, axis of rotation). The axis of movement of the positioner element may be aligned substantially parallel with another axis (e.g., longitudinal axis, centerline, axis of rotation) along which the device to be measured is moved along. For example, the positioner element may monitor a position and/or movement of a valve element (e.g., a valve plug, a valve head, a valve disc, etc.) where the valve element is at least partially moved (e.g., linearly moved, translated) along the another axis. Linear movement of the valve element may be at least partially transformed into rotational movement of the positioner. For example, linear movement of the valve assembly along the another axis of movement of the valve element may be altered into rotation of a portion of the positioner. Such rotation of the positioner element may be monitored by a portion of the positioner locally and/or with a remote assembly, in order to determine the position and/or movement of the valve element.

It is noted that while the embodiments of positioners disclosed herein are described in relation to valve positioners, embodiments of the disclosure may be utilized in other systems and assemblies (e.g., in systems implementing linear movement, for example, with a linear actuator).

The term "valve" or "valve element" as used herein may encompass the most generic uses of the term as used in the art, including the definition of a device that at least partially controls the flow of a liquid, gas, and/or solid.

FIG. 1 is an assembly or system 100 including a valve actuator 102 coupled to a valve assembly 104 with the valve assembly 104 in an open position. The valve assembly 104 may comprise a valve element 105 (e.g., a valve plug, a valve head, a valve disc, etc.) that is moved at least partially in a linear direction (e.g., linearly moved, translated) by the valve actuator 102. For example, the valve assembly 104 may comprise one or more of a plug valve, a globe valve, a gate valve, a diaphragm valve, etc.

As shown in FIG. 1, the valve actuator 102 (e.g., an electrical actuator, a pneumatic actuator, a hydraulic actuator, combinations thereof, etc.) include a motiving mechanism (e.g., a motor) coupled to a shaft (e.g., valve stem 106). The valve stem 106 is coupled to the valve assembly 104. Operation of the valve actuator 102 raises or lowers the valve stem 106 along an axis (e.g., longitudinal axis $L_{106}$, centerline) within a support frame 108.

In some embodiments, the valve stem 106 may also move in a direction transverse to the longitudinal axis $L_{106}$ and/or rotate about the longitudinal axis $L_{106}$.

Valve actuator 102 may include, for example, drive train, hardware, devices, electronics, and/or software utilized in operating a valve system. The drive train of the valve actuator 102 may encompass any prime mover, any manual operation mechanism, any disengagement or isolation mechanisms, braking mechanisms, any speed modulation mechanisms, and the mechanisms for attachment to the valve element 105.

In some embodiments, the valve actuator 102 may comprise a long stroke valve actuator 102. For example, the valve actuator 102 may have the capability of moving the valve element 105 a distance of more than 12 inches (e.g., about 30 cm).

The system 100 may include a positioner assembly 110 with one or more portions of the positioner assembly 110 being located proximate (e.g., adjacent) the valve stem 106 and/or frame 108. For example, the positioner assembly 110 may be positioned directly adjacent and coupled to the frame 108.

In some embodiments, a control system 112 of the positioner assembly 110 may be coupled to a portion of the positioner assembly 110 (e.g., position monitoring device 114) and may monitor one or more aspects of the position monitoring device 114 locally and/or integrally (e.g., in the same working environment as a majority of the valve system 100, integral with the valve system 100) and/or remotely (e.g., in a location removed from the working environment of the majority of the valve system 100). For example, the position monitoring device 114 may monitor movement (e.g., rotation) of a movable element 116 (e.g., a rotatable member exhibiting a full or partial tubular shape) that is in communication with the valve stem 106 in order to provide feedback regarding the position of the valve stem 106 to the position monitoring device 114. The position monitoring device 114 may include one or more sensors 118 in the position monitoring device 114 (e.g., a potentiometer, a single-turn pot potentiometer, a multi-turn pot potentiometer) that is utilized to monitor the position and/or movement of the movable element 116. In other embodiments, other position sensors (e.g., digital and/or analogue sensors, linear and/or rotary sensors) may be utilized, such as, for example, encoders, inductive sensors, capacitance sensors, current sensors, optical sensors, ultrasonic sensors, magnetic sensors, combinations thereof, or any other suitable sensor.

In some embodiments, the position monitoring device 114 may include a gear assembly 120 that may alter the amount of movement (e.g., gear ratio) between the movable element 116 and the sensor 118. For example, the gear assembly 120 may alter a quarter turn (e.g., 90 degrees) of the movable element 116 to rotate the sensor 118 a full turn (e.g., 360 degrees). In some embodiments, the gear assembly 120 may include a device to engage and disengage the movable element 116 (e.g., a clutch).

The movable element 116 may rotate about an axis (e.g., longitudinal axis $L_{116}$, centerline, axis of rotation) of the movably element 116. The movable element 116 may be movably coupled to a portion of the valve system 100 (e.g., to the support frame 108) via bracket assembly 122 and one or more bearing assemblies 124 (e.g., positioned on either end of the movable element 116). For example, a shaft 126 (e.g., stub shaft, a full shaft) on each bearing assembly 124 may be coupled and/or inserted into the movable element 116. In some embodiments, one or more of the movable element 116, the bearing assemblies 124, the shafts 126, or interfaces between these elements may include a biasing member (e.g., a torsion spring) in order to bias the movable element 116 in one position (e.g., in a position where the valve assembly 104 is in an open position, in a position where the valve assembly 104 is in a closed position, or a position between the open position and the closed position).

As depicted in FIG. 1, the movable element 116 may be configured as a track where another element (e.g., a track follower) that is associated with (e.g., coupled to) the valve stem 106 acts to displace (e.g., rotate) the movable element 116 as the valve stem 106 is moved linearly. For example, a protrusion (e.g., a pin 128, a roller, another type of track follower) that is coupled (e.g., rigidly coupled, non-movably coupled, stationarily coupled) to the valve stem 106 (e.g., via linkage 130 configured as a removable plate or arm) may travel in a complementary recess (e.g., track 132, groove, channel, detent, etc.) in order to rotate the movable element 116. In other embodiments, the recess or the track may be positioned on (e.g., coupled to) the valve stem 106 while the protrusion is positioned on the positioner assembly 110.

In some embodiments, the coupling between the valve stem 106 and the pin 128 may include the first linkage 130 coupled to the pin 128 and a second linkage 131 that is coupled to the valve stem 106. Such a second linkage 131 may enhance the ability to remove, attach, and/or position the pin 128 and/or may be configured to guide the valve stem 106 along a track (e.g., a rail defined along the frame 108).

The track 132 may comprise an undulating shape (e.g., a helical shape, a spiral shape, a twisted shape, a curved shape, combinations thereof, etc.) that extends in a direction at least partially transverse to the longitudinal axis $L_{116}$ of the movable element 116. For example, the track 132 may exhibit a substantially helical shape extending about an outer portion (e.g., an outermost portion, an outer circumference) of the movable element 116 (e.g., about an outer circumference). In some embodiments, the track 132 may only extend about a portion of the outer portion of the movable element 116 (e.g., less than one half of the circumference, less than an entirety of the circumference). In some embodiments, the track 132 may extend about an entirety of the outer portion of the movable element 116 (e.g., an entirety of the circumference or more). For example, the track 132 may wrap around the outer portion of the movable element 116 one or more times (e.g., one time, two times, three times, variations therebetween, or more).

In some embodiments, increasing the amount of angular movement of the movable element 116 by increasing the length of the track 132 and/or with a gear assembly 120 may provide a relatively larger number of determinable positions of the movable element 116 and/or a greater degree of movement of the movable element 116 to be sensed by the position monitoring device 114. Such configurations may be utilized to increase the precision of the positioner assembly 110 by providing relatively larger distances over which the position monitoring device 114 and/or the movable element 116 travel.

While the embodiment of FIG. 1 depicts the movable element 116 as a substantially cylindrical structure, in other embodiments, the movable element 116 may comprise any structure suitable to define a path, course, or track (e.g., the track 132). For example, the movable element 116 may comprise a structure having two curved structures defining each lateral side of the track 132, a rolled plate, etc.

In some embodiments, the system 100 (e.g., alone or in cooperation with an external device) may enable a configuration (e.g., an initial configuration) of the positioner assembly 110 to correlate positions of the position monitoring device 114 and/or the movable element 116 relative to the position of the valve stem 106 and/or a portion of the valve assembly 104 (e.g., the valve element 105). For example, a first position (e.g., a first predetermined angular position) of the position monitoring device 114 may be set (e.g., by providing stored values in the control system 112) where the valve stem 106 and/or the valve element 105 are in a position where the valve element 105 is seated (e.g., blocking and/or redirecting some amount of fluid flow through the valve assembly 104). A second position (e.g., a second predetermined angular position) of the position monitoring device 114 may be set (e.g., by providing stored values in the control system 112) where the valve stem 106 and/or the valve element 105 are in a position where the valve element 105 is unseated (e.g., enabling, not blocking, and/or another redirecting of some amount of fluid flow through the valve assembly 104).

In some embodiments, intermediate positions of the position monitoring device 114 may also be set such that one or more intermediate positions (e.g., midpoints, intermediate angular positions) of the valve stem 106 and/or the valve element 105.

Figure 2:
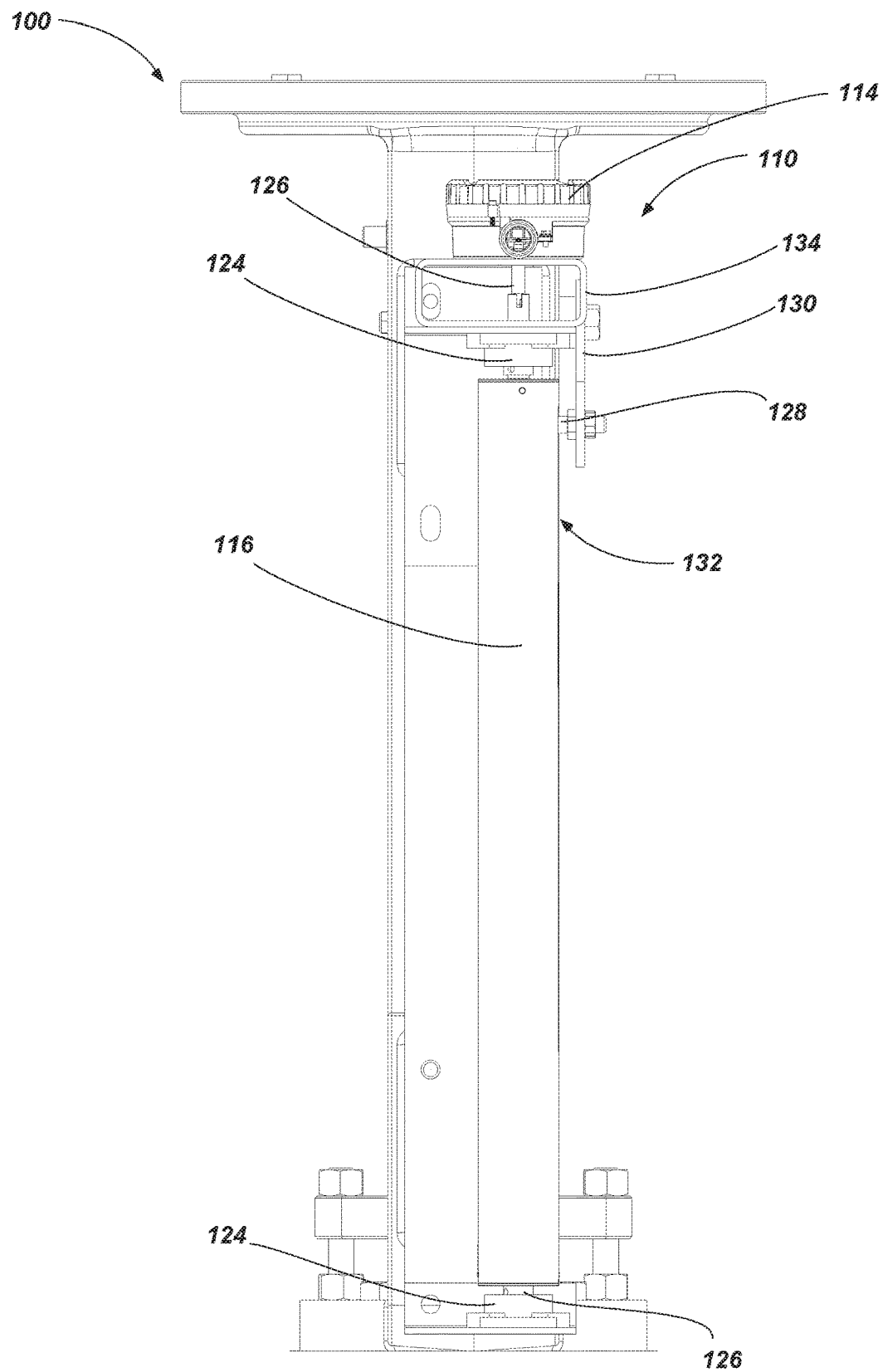
FIG. 2 is a side view of a portion of the system of FIG. 1.

FIG. 2 is a side view of a portion of the system 100 of FIG. 1 showing the positioner assembly 110. As shown in FIGS. 1 and 2, the pin 128, which is coupled to the linkage 130, may be at least partially inserted into the track 132.

As discussed above, the movable element 116 may be mounted (e.g., on opposing sides of the movable element 116) on shafts 126 (e.g., stub shafts). Each of the shafts 126 may be associated with (e.g., coupled to, extend at least partially or entirely through) the bearing assemblies 124. In other embodiments, the bearing assemblies 124 may be coupled directly to the movable element 116. As depicted, a portion of one of the shafts 126 may extend from one of the bearing assemblies 124 to the position monitoring device 114. In such a configuration, the position monitoring device 114 may monitor movement of the movable element 116 via the shaft 126.

While FIG. 2 depicts the shaft 126 extending directly to (e.g., directly into) the position monitoring device 114 from the bearing assembly 124, other configurations may be utilized. For example, the shaft 126 or another component of the positioner assembly 110 may be coupled to flexible coupling and/or a joint, such as, a gear drive (e.g., a right angle gear drive) or a universal joint, in order to position the position monitoring device 114 relatively further away from the frame 108 than that shown in FIG. 2 (e.g., laterally offset from the frame 108 on a side of the frame 108).

In some embodiments, the position monitoring device 114 may be mounted to the frame 108 (e.g., and spaced from the movable element 116) with bracket 134 (e.g., exhibiting a substantially rectangular and/or oval shape).

Figure 3:
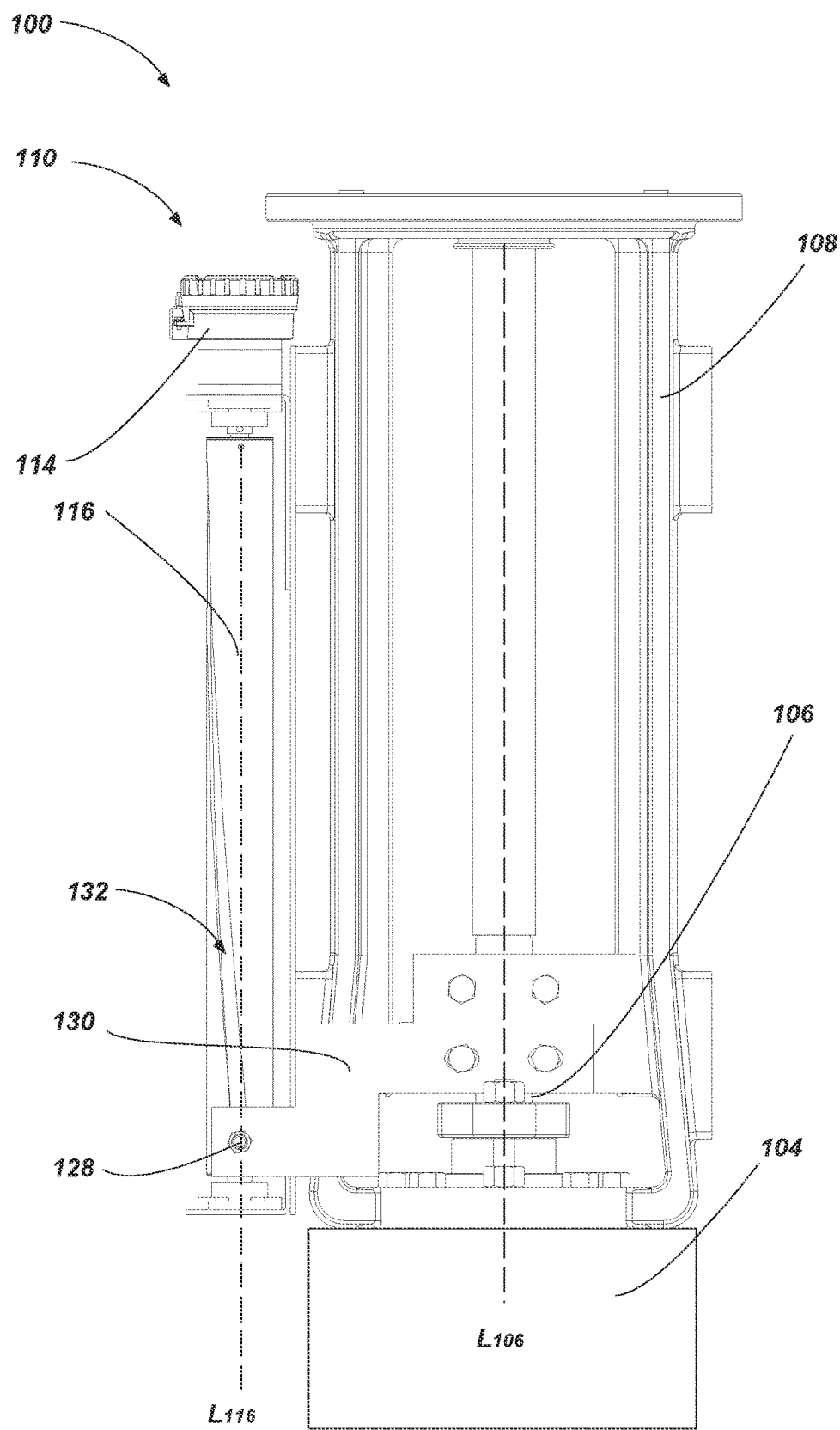
FIG. 3 is a front view of the system of FIG. 1 shown with the valve assembly in a closed position.

FIG. 3 is a front view of the system of FIG. 1 shown with the valve assembly in a closed position. As shown in FIG. 3, the valve stem 106, along with the linkage 130 coupled to the valve stem 106, has been moved (e.g., downward) to a position proximate the valve assembly 104 to place the valve assembly 104 in a closed position. As the valve stem 106 is moved downward from the open position of the valve assembly 104 as shown in FIG. 1 (e.g., along longitudinal axis $L_{106}$), the pin 128 interacts with the movable element 116 in the track 132 to rotate the movable element 116 (e.g., about longitudinal axis $L_{116}$). The rotation of the movable element 116 by a selected amount of degrees and/or a resultant position of the movable element 116 may be sensed by the position monitoring device 114 and utilized to determine (e.g., with the control system 112) the position of the valve stem 106 and/or a portion of the valve assembly 104 (e.g., the valve element 105).

While the embodiment shown in FIGS. 1 through 3 has been described as having a particular protrusion and track type configuration, other configurations (e.g., mechanical linkages) are contemplated. For example, the mechanism for tracking linear movement of one or more of the valve stem 106 and/or valve assembly 104 (e.g., the valve element 105) may comprise a movable element coupled to a portion of the valve system 100 (e.g., the valve stem 106) that rotates about a threaded rod (see, e.g., the leadscrew embodiment of FIG. 4 discussed below), a movable element that rotates about a twisted rod, a movable element that translates along a threaded rod, a cam and follower configuration, a linear bearing that interacts with a slot or protrusion on a rotating structure, other interacting structures that are back drivable, combinations thereof, or any other suitable configurations to track movement of portions of the valve system 100.

Figure 4:
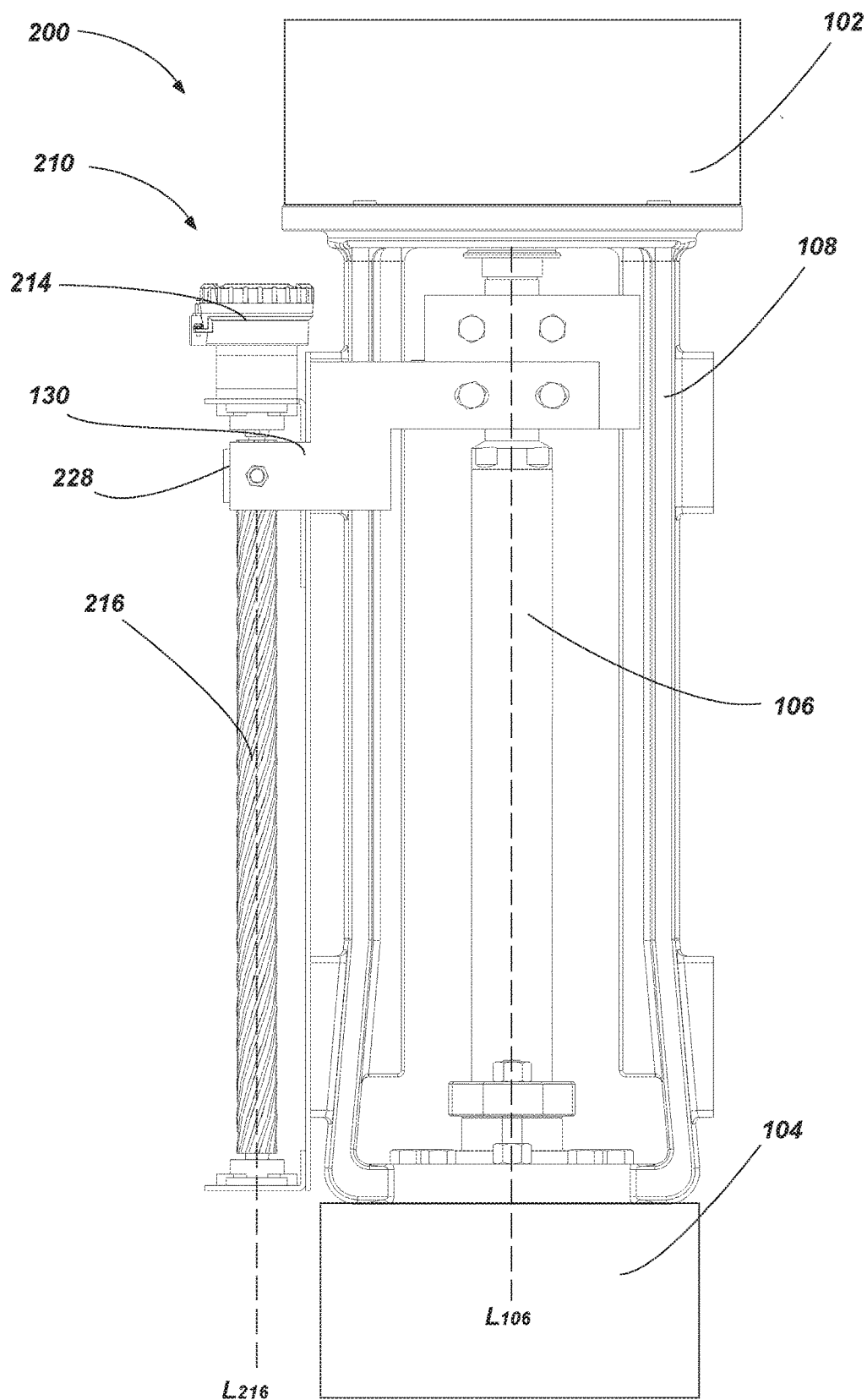
FIG. 4 is a front view of a system including a valve actuator coupled to a valve assembly with the valve assembly in an open position in accordance with an embodiment of the present disclosure.

FIG. 4 is a front view of a system 200 including a valve actuator 102 coupled to a valve assembly 104 with the valve assembly 104 in an open position. In some embodiments, the valve system 200 may be somewhat similar and include similar or the same components as the system 100 described with reference to FIGS. 1 through 3. As shown in FIG. 4, the system 200 may include a positioner assembly 210 with one or more portions of the positioner assembly 210 being located proximate (e.g., adjacent) the valve stem 106 and/or frame 108.

The positioner assembly 210 may include a movable element (e.g., a threaded rod 216) that rotates about an axis (e.g., longitudinal axis $L_{216}$, centerline, axis of rotation) of the threaded rod 216. As depicted, the threaded rod 216 may have a relatively large thread pitch and/or a relatively low thread count (thread per inch (TPI)). For example, the threads may extend a relatively large angle from a lateral or horizontal axis that is perpendicular to the longitudinal axis $L_{216}$ (e.g., more than 45 degrees from horizontal, more than 60 degrees from horizontal, etc.).

The threaded rod 216 may be configured as a track (e.g., defined by the channel(s) defined between threads) where another element that is associated with (e.g., coupled to) the valve stem 106 acts to displace (e.g., rotate) the threaded rod 216 as the valve stem 106 is moved linearly. For example, an element having one or more complementary threads or other protrusions (e.g., a threaded ring 228 having threads on the inside of the ring or another annular structure) that is coupled to the valve stem 106 (e.g., via linkage 130 configured as a removable plate or arm) may travel along the longitudinal axis $L_{216}$ of the threaded rod 216 in order to rotate the threaded rod 216). In other embodiments, the threaded rod 216 may be positioned on (e.g., coupled to) the valve stem 106 while the threaded ring 228 is positioned on the positioner assembly 210.

The threaded rod 216 may be coupled (e.g., directly or indirectly) to the position monitoring device 214 in order to detect rotation of the threaded rod 216 as the valve stem 106 is moved.

Referring to FIGS. 1 through 4, in operation, as the valve stem 106 is moved between the open position of the valve assembly 104 as shown in FIGS. 1 and 4 and the closed position as shown in FIG. 3 (e.g., along longitudinal axis $L_{106}$), the pin 128 interacts with the movable element 116 in the track 132 to rotate the movable element 116 (e.g., about longitudinal axis $L_{116}$). In the embodiment of FIG. 4, the threaded ring 228 interacts with the threaded rod 216 to rotate the threaded rod 216 (e.g., about longitudinal axis $L_{216}$). The amount of rotation of the movable element 116 or the threaded rod 216 by a selected amount of degrees is determined by the length of the track 132 or a characteristic of the threads (e.g., the pitch) on the threaded rod 216.

Rotation of the movable element 116 or the threaded rod 216 by a selected amount of degrees and/or the current position of the movable element 116 is sensed by the position monitoring device 114, 214 and is utilized to determine (e.g., with the control system 112) the position of the valve stem 106 and/or a portion of the valve assembly 104 (e.g., the valve element 105). For example, the sensed position of the movable element 116 or the threaded rod 216 may be compared to stored values (e.g., in the control system 112) relating to predetermined positions of the movable element 116 or the threaded rod 216 to determine a current position of the valve stem 106.

Embodiments of the present disclosure may be particularly useful in providing a relatively less complex, reliable, and compact options for sensing the position of one or more portions of a valve assembly. For example, the relatively simple and compact design may reduce interference of the positioner assembly with adjacent structures and/or users. The positioner assembly may also provide a relatively safer design as the positioner assembly contains relatively few pinch points and a relatively low moving mass. Further, the robust design of the positioner assembly may be particularly useful in working environments of the various components of the valve system that may comprise wet or otherwise caustic environments where fluid or other contaminants are present. The configuration of the positioner assembly may be scaled to accommodate for valve actuators having relatively long strokes, while not requiring a relatively large amount of space or volume in which to move the positioner assembly during such a long stroke. For example, the positioner assembly requires little or no lateral clearance for movement during an actuator stroke. Further still, the positioner assembly may have a relatively small moving mass and low moment of inertia that is particularly suitable for fast stroking times. The direct linkage between the positioner assembly and the valve stem enables for relatively high accuracy in position sensing and relatively low hysteresis. The track or cam of the positioner assembly may be customized according to various valve assembly designs and can enable for sensing the position of valve actuators having unique stroking characteristics.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims that follow.

What is claimed is:

1. A valve system comprising:
   a valve assembly configured to alter at least one flow characteristic of fluid flow through the valve system, the valve assembly comprising a valve stem coupled to a valve element at a distal end of the valve stem, the valve stem configured to move the valve element between an open position and a closed position in order to alter the at least one flow characteristic of fluid flow through the valve system;
   a valve actuator coupled to the valve stem at a proximal end of the valve stem, the valve actuator configured to move the valve stem and the valve element of the valve assembly between the open position and the closed position along a first axis of movement; and
   a positioner assembly positioned exterior to the valve actuator configured to sense at least one position of the valve element of the valve assembly, the positioner assembly comprising:
      a rotatable element of the positioner assembly configured to rotate about a second axis of movement, the first axis of movement being substantially parallel to the second axis of movement; and
      at least one position sensor coupled to the rotatable element configured to sense an angular position of the rotatable element;
   a follower element comprising at least one protrusion, the follower element being positioned outside of the rotatable element with the at least one protrusion extending in a radially inward direction from the follower element into at least a portion of the rotatable element at an engagement location, wherein the follower element is configured to rotate the rotatable element along the second axis of movement in response to movement of the valve stem; and
   a linkage coupling the follower element to the valve assembly, wherein a remainder of the rotatable element outside of the engagement location is not enclosed by the follower element or the linkage in both the open position and the closed position of the valve assembly.

2. The valve system of claim 1, wherein the positioner assembly comprises a control system in communication with the at least one position sensor, and wherein the control system is positioned at a location remote to the valve assembly.

3. The valve system of claim 1, wherein the positioner assembly comprises a gear assembly, the gear assembly coupled between the rotatable element and the at least one position sensor, the gear assembly configured to increase the amount of angular movement of the rotatable element that is sensed by the at least one position sensor.

4. The valve system of claim 1, wherein the rotatable element comprises at least one track and the follower element comprises at least one track follower that interacts with the at least one track.

5. The valve system of claim 4, wherein the at least one track of the rotatable element comprises a curved recess extending partially along the second axis of movement, and wherein the at least one track follower is configured to travel along the second axis of movement at least partially within the at least one track.

6. The valve system of claim 5, wherein the at least one track extends at least one of around less than a half rotation of the rotatable element, around less than a full rotation of the rotatable element, or multiple rotations of the rotatable element.

7. The valve system of claim 1, wherein the follower element is configured to interact with the rotatable element during linear movement of the valve stem in order to convert the linear movement into rotational movement to rotate the rotatable element.

8. The valve system of claim 1, wherein the rotatable element comprises a threaded rod, wherein the follower element comprises a threaded follower element having complementary threads to threads of the threaded rod, and wherein linear movement of the threaded follower element acts to rotate the threaded rod.

9. The valve system of claim 1, wherein the rotatable element remains separate from and is not received within the follower element or the linkage in both the open position and the closed position of the valve assembly.

10. A positioner assembly for a valve system, the positioner assembly comprising:
   a rotatable element defining a track, the rotatable element configured to rotate about a first axis of movement that is substantially parallel to a second axis of movement of a linearly movable feature of the valve system configured to adjust fluid flow through the valve system;
   a follower element positioned outside of the rotatable element and in communication with the track of the rotatable element at an engagement portion, wherein the follower element is configured to rotate the rotatable element in response to movement of the linearly movable feature of the valve system along the second axis of movement;
   a linkage directly coupled to the follower element proximate a first end portion of the linkage, the linkage for positioning the follower element relative to the rotatable element, a second end portion of the linkage for coupling to the linearly movable feature of the valve system, wherein a remainder of the rotatable element outside of the engagement portion is not encompassed by the follower element or the linkage; and at least one position sensor coupled to the rotatable element configured to sense an angular position of the rotatable element.

11. The positioner assembly of claim 10, wherein the follower element is configured to be rigidly coupled to a valve stem of the valve system.

12. The positioner assembly of claim 10, further comprising a gear assembly coupled between the rotatable element and the at least one position sensor, wherein the gear assembly is configured to increase an amount of angular movement that is sensed by the at least one position sensor as compared to an amount of angular movement of the rotatable element.

13. The positioner assembly of claim 10, wherein the rotatable element exhibits a cylindrical structure having the track recessed in the cylindrical structure.

14. A method of sensing a position of a component of a valve system with the positioner assembly of claim 10, the method comprising:
  moving a component of the valve system;
  rotating a movable element of the positioner assembly in response to the moving of the component of the valve system;
  moving the movable element with the follower element; and
  sensing a position of the movable element with the at least one position sensor of the positioner assembly.

15. The method according to claim 14, further comprising determining a position of the component of the valve system based on the sensed position of the movable element.

16. The method according to claim 14, wherein rotating the movable element of the positioner assembly comprises moving the movable element with the follower element where the movable element is not received within any portion of the follower element or the linkage.

17. The method according to claim 14, further comprising comparing the sensed position of the movable element to stored values relating to predetermined positions of the movable element to determine a current position of the component of the valve system.

18. The method according to claim 14, further comprising turning the movable element with a follower coupled to the component of the valve system at least partially disposed in a curved track of the movable element.

19. The method according to claim 14, wherein determining the position of the component of the valve system comprises calculating a linear position of a valve stem.

20. The method according to claim 14, further comprising altering an amount of angular movement of the movable element that is sensed by the at least one sensor.

* * * * *